United States Patent
Yan

(10) Patent No.: US 11,743,209 B2
(45) Date of Patent: Aug. 29, 2023

(54) METHOD FOR IMPROVING DATA FLOW AND ACCESS FOR A NEURAL NETWORK PROCESSOR

(71) Applicant: BEIJING BAIDU NETCOM SCIENCE AND TECHNOLOGY CO., LTD., Beijing (CN)

(72) Inventor: Xiaoping Yan, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/792,867

(22) PCT Filed: Aug. 5, 2021

(86) PCT No.: PCT/CN2021/110952
§ 371 (c)(1),
(2) Date: Jul. 14, 2022

(87) PCT Pub. No.: WO2022/037422
PCT Pub. Date: Feb. 24, 2022

(65) Prior Publication Data
US 2023/0179546 A1    Jun. 8, 2023

(30) Foreign Application Priority Data

Aug. 21, 2020   (CN) .......................... 202010851757.7

(51) Int. Cl.
*H04L 49/9057* (2022.01)
*G06F 3/06* (2006.01)
(Continued)

(52) U.S. Cl.
CPC .......... *H04L 49/9057* (2013.01); *G06F 3/061* (2013.01); *G06F 3/0635* (2013.01);
(Continued)

(58) Field of Classification Search
CPC ............................... G06F 3/061; G06F 3/0635
See application file for complete search history.

(56) References Cited

U.S. PATENT DOCUMENTS

2018/0225116 A1* 8/2018 Henry ..................... G06F 17/10
2018/0341862 A1   11/2018 Ehrman
(Continued)

FOREIGN PATENT DOCUMENTS

CN    107590535 A    1/2018
CN    108256628 A    7/2018
(Continued)

OTHER PUBLICATIONS

International Search Report of PCT/CN2021/110952 dated Nov. 4, 2021, 7 pages.
(Continued)

*Primary Examiner* — David Yi
*Assistant Examiner* — Nicholas A. Paperno
(74) *Attorney, Agent, or Firm* — Brooks Kushman P.C.

(57) ABSTRACT

A processor, processor implementation method, and a storage medium are disclosed, which relates to the field of artificial intelligence and deep learning. The processor includes: a system controller a data packing and unpacking module, a storage array module, and an operation module configured to perform operation processing on the acquired first packet, generate the second packet according to the operation result data, and return the second packet to the data packing and unpacking module. The storage array module comprises N1 storage units. The data packing and unpacking module comprises N2 data packing and unpacking units, each of the data packing and unpacking units is connected to the routing and switching module through a data channel. The universal operation module comprises M operation units. The activation operation module comprises
(Continued)

P operation unit, each of the operation units is connected to the routing and switching module through a data channel.

14 Claims, 4 Drawing Sheets

(51) Int. Cl.
*H04L 45/74* (2022.01)
*H04L 49/90* (2022.01)

(52) U.S. Cl.
CPC ............ *G06F 3/0679* (2013.01); *H04L 45/74* (2013.01); *H04L 49/9063* (2013.01)

(56) References Cited

U.S. PATENT DOCUMENTS

| | | | |
|---|---|---|---|
| 2019/0303198 A1* | 10/2019 | Kim | G06N 3/04 |
| 2020/0034148 A1 | 1/2020 | Sumbul et al. | |
| 2020/0034698 A1 | 1/2020 | Chen et al. | |
| 2020/0202215 A1 | 6/2020 | Sadowski | |
| 2020/0242459 A1 | 7/2020 | Manipatruni et al. | |
| 2021/0125042 A1* | 4/2021 | Han | G06N 3/063 |

FOREIGN PATENT DOCUMENTS

| | | |
|---|---|---|
| CN | 109104876 A | 12/2018 |
| CN | 109284823 A | 1/2019 |
| CN | 109993683 A | 7/2019 |
| CN | 110334799 A | 10/2019 |
| CN | 110990060 A | 4/2020 |
| CN | 111241028 A | 6/2020 |
| CN | 111382847 A | 7/2020 |
| CN | 109284823 B | 8/2020 |
| CN | 111523652 A | 8/2020 |
| CN | 112152947 A | 12/2020 |
| CN | 112152947 B | 7/2021 |

OTHER PUBLICATIONS

Li et al., "Development status, challenges and countermeasures of depository and accounting integration", Sep. 2019, the World Computer Conference was held in Changsha, Hunan Province, 5 pages.
Imani et al., "Digital-based processing in-memory: a highly-parallel accelerator for data intensive applications", Proceedings of the International Symposium on Memory System, Sep. 30, 2019, 4 pages.

\* cited by examiner

METHOD FOR IMPROVING DATA FLOW AND ACCESS FOR A NEURAL NETWORK PROCESSOR

CROSS-REFERENCE TO RELATED APPLICATIONS

This application is the national phase of PCT Application No. PCT/CN2021/110952 filed on Aug. 5, 2021, which claims priority to Chinese Patent Application No. 202010851757.7, filed on Aug. 21, 2020, which are hereby incorporated in their entireties by reference herein.

FIELD OF THE DISCLOSURE

The present application relates to computer application technologies, and in particular, to a processor and an implementation method, an electronic device, and a storage medium in the field of artificial intelligence and deep learning.

BACKGROUND OF THE DISCLOSURE

Increasingly intelligent applications make neural network algorithms more diversified, making the overall neural network model increasingly complex, and correspondingly, bringing a greater number of operations and data storage interactions. Therefore, more and more attention is paid to neural network-based processors such as neural Network Processing Unit (NPU) chips.

The current NPU includes two mainstream design manners taking an accelerator and instruction extension as the core respectively. The former is seldom used due to poor universality and expansibility, and the latter is mainly used. However, in the latter, a cumbersome instruction set corresponding to neural network operation is required to be expanded, and a special compiler is required to be developed for support, which is very difficult to design, especially when applied to real-time processing of speech data.

SUMMARY OF THE DISCLOSURE

The present application provides a processor and an implementation method, an electronic device, and a storage medium.

A processor, including: a system controller, a storage array module, a data packing and unpacking module, and an operation module;

the system controller being configured to send predetermined packet information to the data packing and unpacking module;

the data packing and unpacking module being configured to acquire corresponding packet data from the storage array module according to the packet information, pack the packet data with the packet information, send a first packet obtained from packing to the operation module for operation processing, acquire a second packet returned by the operation module, unpack the second packet to obtain operation result data, and store the operation result data in the storage array module;

the storage array module being configured to store data; and the operation module being configured to perform operation processing on the acquired first packet, generate the second packet according to the operation result data, and return the second packet to the data packing and unpacking module.

A processor implementation method, including:

building a processor including a system controller, a storage array module, a data packing and unpacking module, and an operation module; and performing a neural network operation by using the processor; wherein the system controller is configured to send predetermined packet information to the data packing and unpacking module; the data packing and unpacking module is configured to acquire corresponding packet data from the storage array module according to the packet information, pack the packet data with the packet information, send a first packet obtained from packing to the operation module for operation processing, acquire a second packet returned by the operation module, unpack the second packet to obtain operation result data, and store the operation result data in the storage array module; the storage array module is configured to store data; and the operation module is configured to perform operation processing on the acquired first packet, generate the second packet according to the operation result data, and return the second packet to the data packing and unpacking module.

An electronic device, including:

at least one processor; and a memory in communication connection with the at least one processor; wherein the memory stores instructions executable by the at least one processor, and the instructions are executed by the at least one processor to enable the at least one processor to perform the method as described above.

A non-transitory computer-readable storage medium storing computer instructions, wherein the computer instructions are configured to cause a computer to perform the method as described above.

One embodiment in the above application has the following advantages or beneficial effects. An implementation of integrated storage and calculation is proposed, in which the whole interaction between neural network storage and operation is completed in the processor, preventing complex instruction design and difficult compiler development, thereby reducing difficulty of the design and improving overall processing efficiency.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present application. In the drawings.

DETAILED DESCRIPTION OF PREFERRED EMBODIMENTS

Exemplary embodiments of the present application are illustrated below with reference to the accompanying drawings, which include various details of the embodiments of the present application to facilitate understanding and should be considered only as exemplary. Therefore, those of ordinary skill in the art should be aware that various changes and modifications can be made to the embodiments described herein without departing from the scope and spirit of the present application. Similarly, for clarity and simplicity, descriptions of well-known functions and structures are omitted in the following description.

In addition, it shall be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
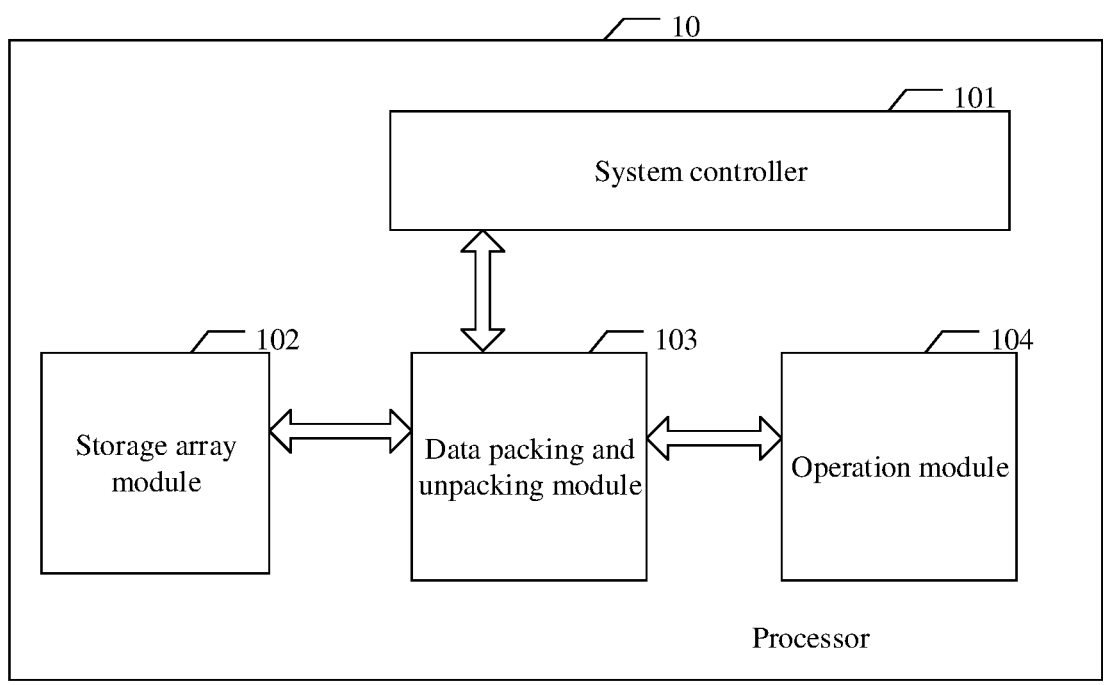
FIG. 1 is a schematic structural diagram of composition of a first embodiment of a processor 10 according to the present application.

FIG. 1 is a schematic structural diagram of composition of a first embodiment of a processor 10 according to the present application. As shown in FIG. 1, a system controller 101, a storage array module 102, a data packing and unpacking module 103, and an operation module 104 are included.

The system controller 101 is configured to send predetermined packet information to the data packing and unpacking module 103.

The data packing and unpacking module 103 is configured to acquire corresponding packet data from the storage array module 102 according to the packet information, pack the packet data with the packet information, send a first packet obtained from packing to the operation module 104 for operation processing, acquire a second packet returned by the operation module 104, unpack the second packet to obtain operation result data, and store the operation result data in the storage array module 102.

The storage array module 102 is configured to store data.

The operation module 104 is configured to perform operation processing on the acquired first packet, generate the second packet according to the operation result data, and return the second packet to the data packing and unpacking module 103.

As can be seen, an implementation of integrated storage and calculation is proposed in the above embodiment, in which the whole interaction between neural network storage and operation is completed in the processor, preventing complex instruction design and difficult compiler development, thereby reducing difficulty of the design and improving overall processing efficiency.

On the basis of FIG. 1, the processor 10 may further include one or all of the following: a Direct Memory Access (DMA) module and a routing and switching module.

Figure 2:
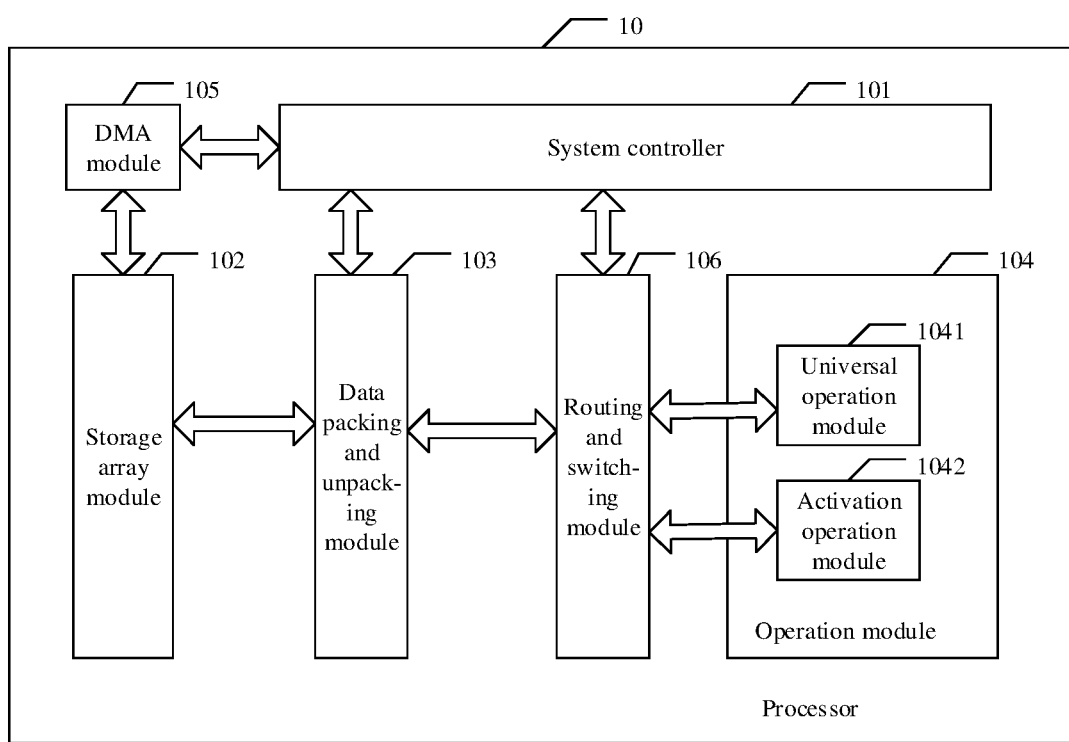
FIG. 2 is a schematic structural diagram of composition of a second embodiment of the processor 10 according to the present application.

Preferably, the above two modules may be included at the same time. Accordingly, FIG. 2 is a schematic structural diagram of composition of a second embodiment of the processor 10 according to the present application. As shown in FIG. 2, a system controller 101, a storage array module 102, a data packing and unpacking module 103, an operation module 104, a DMA module 105, and a routing and switching module 106 are included.

The DMA module 105 is configured to realize high-speed exchange of external storage data with internal storage array data in the storage array module 103 under the control of the system controller 101.

The routing and switching module 106 is configured to send the first packet acquired from the data packing and unpacking module 103 to the operation module 104 and send the second packet acquired from the operation module 104 to the data packing and unpacking module 103.

As shown in FIG. 2, the operation module 104 may further include: a universal operation module 1041 and an activation operation module 1042. As the name suggests, the universal operation module 1041 may be configured to perform universal operation, and the activation operation module 1042 may be configured to perform activation operation.

The system controller 101 may be designed with a simple control logic or state machine, or may include a complex processor IP. IP is the abbreviation of Internet Protocol. For example, the complex processor IP may include Advanced RISC Machine (ARM), Digital Signal Processor (DSP), X86, Microcontroller Unit (MCU) kernel IPs, etc.

The storage array module 102 may be composed of multiple sets of Static Random-Access Memories (SRAMs), supports simultaneous reading or writing of multiple ports at high speeds, and can realize data caching or storage in the form of a matrix. Data stored in the storage array module 102 may include neural network model data, external input data, intermediate-layer temporary data, etc.

The data packing and unpacking module 103 may perform data reading and storage operations on the storage array module 102, pack the packet information acquired from the system controller 101 with packet data acquired from the storage array module 102, send, through the routing and switching module 106, a first packet obtained from packing to the operation module 104, unpack, through the routing and switching module 106, a second packet returned by the operation module 104, and store obtained operation result data in the storage array module 102.

Correspondingly, the routing and switching module 106 may receive packets of the data packing and unpacking module 103 and the operation module 104 for data exchange or the like.

The universal operation performed by the universal operation module 1041 may include universal vector operation such as four arithmetic operations of vectors, logic operation, comparison operation, dot product, accumulation, and summation. The activation operation performed by the activation operation module 1042 may include one or more of nonlinear function sigmoid, tanh, relu, and softmax operations.

The system controller 101 may manage and control the whole, for example, as described above, send the packet information to the data packing and unpacking module 103, so that the data packing and unpacking module 103 can pack and unpack data, and may be responsible for starting the DMA module 105 to realize high-speed exchange of external storage data with internal storage array data in the storage array module 102.

As can be seen, in the above embodiment, the processor adopts a main structure of the storage array module, the data packing and unpacking module, and the routing and switching module on the whole to complete the whole interaction between neural network storage and operation, which prevents complex instruction design and difficult compiler development, thereby reducing difficulty of the design and improving overall processing efficiency.

Figure 3:
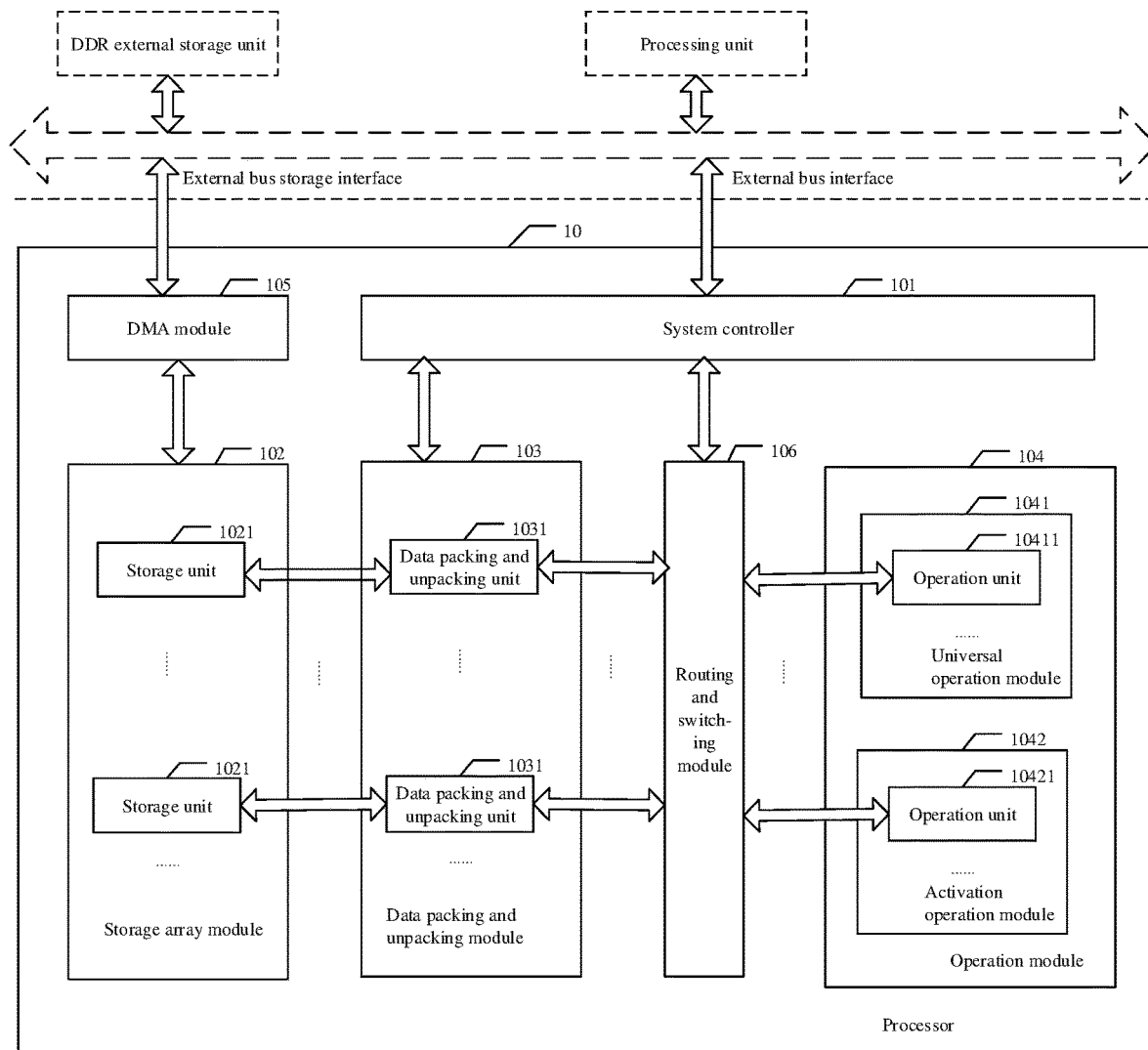
FIG. 3 is a schematic structural diagram of composition of a third embodiment of the processor 10 according to the present application.

FIG. 3 is a schematic structural diagram of composition of a third embodiment of the processor 10 according to the present application. As shown in FIG. 3, a system controller 101, a storage array module 102, a data packing and unpacking module 103, an operation module 104, a DMA module 105, and a routing and switching module 106 are included. The storage array module 102 may include N1 storage units 1021. Each storage unit 1021 may be a set of SRAMs. The data packing and unpacking module 103 may include N2 data packing and unpacking units 1031. Each data packing and unpacking unit 1031 may be connected to the routing and switching module 106 through a data channel. N1 and N2 are positive integers greater than 1. In addition, the universal operation module 1041 may include M operation units 10411. The activation operation module 1042 may include P operation units 10421. Each operation unit 10411/10421 may be connected to the routing and switching module 106 through a data channel M and P are positive integers greater than 1. Specific values of N1, N2, M, and P may be determined according to actual requirements.

Correspondingly, the data packing and unpacking unit 1031 may pack the packet data acquired from the storage unit 1021 with the packet information acquired from the system controller 101, use the data channel to send, through the routing and switching module 106, a first packet obtained from packing to the operation unit 10411/10421 for operation processing, use the data channel to acquire, through the routing and switching module 106, a second packet returned by the operation unit 10411/10421, unpack the second packet to obtain operation result data, and store the operation result data in the storage unit 1021.

In practical applications, the system controller 101 may simulate details of each neural network operation, such as which data is to be acquired, where to acquire the data, and what kind of operation is to be performed. Accordingly, packet information may be generated and sent to the related data packing and unpacking unit 1031. The data packing and unpacking units 1031 may operate in parallel, for example, acquire packet information from the system controller 101, and perform packing and unpacking operations.

Accordingly, the packet information may include: a source channel, a source address, a destination channel (an operation channel), an operation type, a packet length, and the like. The data packing and unpacking unit 1031 may acquire the packet data from the source address of the storage unit 1021 corresponding to the source channel. The routing and switching module 106 may send the acquired first packet to the operation unit 10411/10421 corresponding to the destination channel The operation unit 10411/10421 may perform operation processing of a corresponding type according to the operation type.

Preferably, N1 and N2 have same values. That is, the storage units 1021 and the data packing and unpacking units 1031 are the same in number. Each data packing and unpacking unit 1031 may correspond to a storage unit 1021 and acquire the packet data from the corresponding storage unit 1021. In this way, parallel operation of the data packing and unpacking units 1031 can be better ensured. Assuming that two data packing and unpacking units 1031 may acquire data from a storage unit 1021, a waiting situation may occur. That is, one data packing and unpacking unit 1031 can acquire the data only after the other data packing and unpacking unit 1031 has acquired the data, thereby reducing efficiency.

In the above processing manner, through the division of the units, the parallel processing capability is improved, and then storage and interaction capability of data is improved.

In the existing NPU with instruction extension as the core, data is stored and exchanged in a uniform load/store mode for sequential synchronous operations, which is inefficient. However, after the use of the processing manner in the present application, the data can be processed in parallel, and a waiting delay caused by the synchronous operations is prevented, so that the system control and data storage and interaction are more efficient.

The packet information may further include: a destination address or a storage strategy. If the packet information includes the destination address, the data packing and unpacking unit 1031 may store the operation result data in the corresponding storage unit 1021 according to the destination address. If the packet information includes the storage strategy, the data packing and unpacking unit 1031 may store the operation result data in the corresponding storage unit 1021 according to the storage strategy. The storage strategy may be a storage strategy to implement data alignment.

After the operation unit 10411/10421 completes the operation, data in data segments in the first packet may be replaced with the operation result data, and the data length may generally change. Therefore, data length information in the packet is required to be modified, and the generated second packet is returned to the data packing and unpacking unit 1031 according to a transmission path of the first packet. After the data packing and unpacking unit 1031 parses the operation result data from the second packet, a problem of how to store the operation result data may be involved.

Correspondingly, the packet information may include: a source channel, a source address, a destination channel, and a destination address, that is, may include a source address, a destination channel, and channel addresses on two sides. In this way, the data packing and unpacking unit 1031 may store the acquired operation result data in the corresponding storage unit 1021 according to the destination address. Alternatively, the packet information may include a storage strategy instead of the destination address. The data packing and unpacking unit 1031 may store the operation result data in the corresponding storage unit 1021 according to the storage strategy, so as to achieve automatic alignment of the data.

The storage strategy may be specifically determined according to an actual requirement, which may include, for example, up alignment, down alignment, and how to process (such as filling) other parts after alignment.

The operations involved in the neural network may lead to data reduction or expansion. That is, the data length may change, which easily causes misalignment of the data after the operation. In the existing NPU with instruction extension as the core, the problem of data alignment is generally solved by additional data conversion or transpose. Such an additional operation may reduce the overall processing efficiency. Since the neural network operation involves a large number of repeated storage operation interactive iterations, the overall processing efficiency may be greatly affected. However, in the processing manner of the present application, storage and operation interact freely through routing and switching, and the storage is automatically completed through the storage strategy to realize automatic data alignment. The implementation manner is simple, and the overall processing efficiency is improved.

As shown in FIG. 3, the system controller 101 may interact with a processing unit through an external bus interface, and the DMA module 105 may interact with a Double Data Rate (DDR) external storage unit through an external bus storage interface, specific implementations of which are prior arts.

The above is an introduction to the apparatus embodiment, and the following is a further description of the solution according to the present application through a method embodiment.

Figure 4:
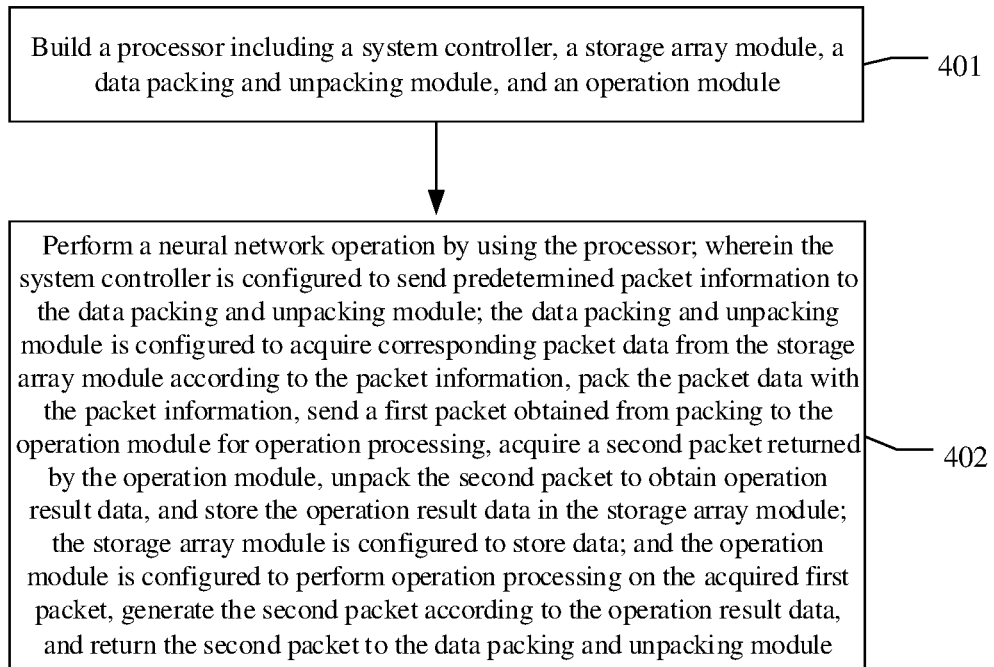
FIG. 4 is a flowchart of an embodiment of a processor implementation method according to the present application.

FIG. 4 is a flowchart of an embodiment of a processor implementation method according to the present application. As shown in FIG. 4, the following specific implementation is included.

In 401, a processor including a system controller, a storage array module, a data packing and unpacking module, and an operation module is built.

In 402, a neural network operation is performed by using the processor; wherein the system controller is configured to send predetermined packet information to the data packing and unpacking module; the data packing and unpacking module is configured to acquire corresponding packet data from the storage array module according to the packet information, pack the packet data with the packet information, send a first packet obtained from packing to the operation module for operation processing, acquire a second packet returned by the operation module, unpack the second packet to obtain operation result data, and store the operation result data in the storage array module; the storage array module is configured to store data; and the operation module is configured to perform operation processing on the acquired first packet, generate the second packet according to the operation result data, and return the second packet to the data packing and unpacking module.

Based on the above, a DMA module is added to the processor. The DMA module may be configured to realize high-speed exchange of external storage data with internal storage array data in the storage array module under the control of the system controller.

In addition, a routing and switching module may be added to the processor. The routing and switching module may be configured to send the first packet acquired from the data packing and unpacking module to the operation module and send the second packet acquired from the operation module to the data packing and unpacking module.

The operation module may include: a universal operation module configured to perform universal operation and an activation operation module configured to perform activation operation.

In addition, the storage array module may include N1 storage units, the data packing and unpacking module may include N2 data packing and unpacking units, and each of the data packing and unpacking units is connected to the routing and switching module through a data channel, where N1 and N2 are positive integers greater than 1. The universal operation module may include M operation units, the activation operation module may include P operation unit, and each of the operation units is connected to the routing and switching module through a data channel, where M and P are positive integers greater than 1.

Correspondingly, the data packing and unpacking unit may be configured to pack the packet data acquired from the storage unit with the packet information acquired from the system controller, use the data channel to send, through the routing and switching module, a first packet obtained from packing to the operation unit for operation processing, use the data channel to acquire, through the routing and switching module, a second packet returned by the operation unit, unpack the second packet to obtain operation result data, and store the operation result data in the storage unit.

The packet information may include: a source channel, a source address, a destination channel, and an operation type. Correspondingly, the packet data may be packet data acquired by the data packing and unpacking unit from the source address of the storage unit corresponding to the source channel, the operation unit acquiring the first packet may be an operation unit corresponding to the destination channel determined by the routing and switching module, and the operation processing may be operation processing of the operation type performed by the operation unit.

Preferably, N1 and N2 have same values, and each data packing and unpacking unit corresponds to a storage unit and acquires the packet data from the corresponding storage unit.

The packet information may further include: a destination address or a storage strategy. If the packet information includes the destination address, the data packing and unpacking unit may store the operation result data in the corresponding storage unit according to the destination address. If the packet information includes the storage strategy, the data packing and unpacking unit may store the operation result data in the corresponding storage unit according to the storage strategy. The storage strategy may be a storage strategy to implement data alignment.

The specific workflow of the method embodiment shown in FIG. 4 can be obtained with reference to the related description in the above apparatus embodiment and is not repeated.

In conclusion, by use of the solution in the method embodiment of the present application, an implementation of integrated storage and calculation is proposed, in which the whole interaction between neural network storage and operation is completed in the processor, preventing complex instruction design and difficult compiler development, thereby reducing difficulty of the design and improving overall processing efficiency.

According to embodiments of the present application, the present application further provides an electronic device and a readable storage medium.

Figure 5:
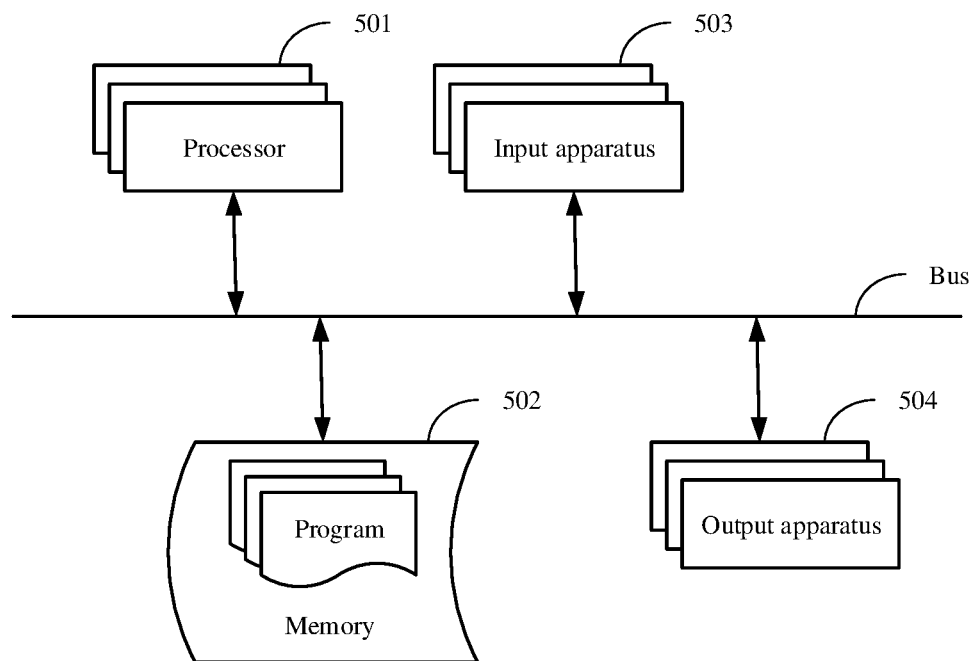
FIG. 5 is a block diagram of an electronic device for the method according to an embodiment of the present application.

FIG. 5 is a block diagram of an electronic device of the method according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present application as described and/or required herein.

As shown in FIG. 5, the electronic device includes: one or more processors 501, a memory 502, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 501 is taken as an example is FIG. 5.

The memory 502 is the non-instantaneous computer-readable storage medium according to the present application. The memory stores instructions executable by at least one processor to cause the at least one processor to perform the method according to the present application. The non-instantaneous computer-readable storage medium according to the present application stores computer instructions. The computer instructions are used to cause a computer to perform the method according to the present application.

The memory 502, as a non-instantaneous computer-readable storage medium, may be configured to store non-instantaneous software programs, non-instantaneous computer executable programs and modules, for example, program instructions/modules corresponding to the method in the embodiment of the present application. The processor 501 runs the non-instantaneous software programs, instructions and modules stored in the memory 502 to execute various functional applications and data processing of a server, that is, to implement the method in the above method embodiment.

The memory 502 may include a program storage area and a data storage area. The program storage area may store an operating system and an application required by at least one function. The data storage area may store data created according to use of the electronic device. In addition, the memory 502 may include a high-speed random access memory, and may further include a non-instantaneous memory, for example, at least one disk storage device, a flash memory device, or other non-instantaneous solid-state storage devices. In some embodiments, the memory 502 optionally includes memories remotely disposed relative to the processor 501. The remote memories may be connected to the electronic device over a network. Examples of the network include, but are not limited to, the Internet, intranets, blockchain networks, local area networks, mobile communication networks and combinations thereof.

The electronic device may further include: an input apparatus 503 and an output apparatus 504. The processor 501, the memory 502, the input apparatus 503 and the output apparatus 504 may be connected through a bus or in other manners. In FIG. 5, the connection through the bus is taken as an example.

The input apparatus 503 may receive input numerical information or character information, and generate key signal input related to user setting and function control of the electronic device, for example, input apparatuses such as a touch screen, a keypad, a mouse, a trackpad, a touch pad, a pointer, one or more mouse buttons, a trackball, and a joystick. The output apparatus 504 may include a display device, an auxiliary lighting apparatus and a tactile feedback apparatus (e.g., a vibration motor). The display device may include, but is not limited to, a liquid crystal display, a light-emitting diode display, and a plasma display. In some implementations, the display device may be a touch screen.

Various implementations of the systems and technologies described herein may be implemented in a digital electronic circuit system, an integrated circuit system, an application-specific integrated circuit, computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display apparatus (e.g., a cathode-ray tube or a liquid crystal display monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementations of the systems and technologies described here), or a computing system including any combination of such background components, middleware components or front-end components. The components of the system can be connected to each other through digital data communication in any form or medium (for example, a communication network). Examples of the communication network include: a local area network, a wide area network, a blockchain network and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the conventional physical host and a virtual private server (VPS) service.

It should be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:

1. A processor, comprising:
a system controller configured to send predetermined packet information to the data packing and unpacking module;
a data packing and unpacking module configured to acquire corresponding packet data from the storage array module according to the packet information, pack the packet data with the packet information, send a first packet obtained from packing to the operation module for operation processing, acquire a second packet returned by the operation module, unpack the second packet to obtain operation result data, and store the operation result data in the storage array module;
a storage array module configured to store data;
an operation module configured to perform operation processing on the acquired first packet, generate the second packet according to the operation result data, and return the second packet to the data packing and unpacking module; and
a routing and switching module configured to send the first packet acquired from the data packing and unpacking module to the operation module and send the second packet acquired from the operation module to the data packing and unpacking module,
wherein the operation module comprises:
a universal operation module configured to perform universal operation; and an activation operation module configured to perform activation operation,
wherein the storage array module comprises N1 storage units;
the data packing and unpacking module comprises N2 data packing and unpacking units, each of the data packing and unpacking units being connected to the routing and switching module through a data channel, N1 and N2 being positive integers greater than 1;
the universal operation module comprises M operation units, and the activation operation module comprises P operation unit, each of the operation units being connected to the routing and switching module through a data channel, M and P being positive integers greater than 1; and
the data packing and unpacking unit packs the packet data acquired from the storage unit with the packet information acquired from the system controller, uses the data channel to send, through the routing and switching module, a first packet obtained from packing to the operation unit for operation processing, uses the data channel to acquire, through the routing and switching module, a second packet returned by the operation unit, unpacks the second packet to obtain operation result data, and stores the operation result data in the storage unit.

2. The processor according to claim 1, further comprising:
a Direct Memory Access (DMA) module configured to realize high-speed exchange of external storage data with internal storage array data in the storage array module under the control of the system controller.

3. The processor according to claim 1, wherein
the packet information comprises: a source channel, a source address, a destination channel, and an operation type;
the data packing and unpacking unit acquires the packet data from the source address of the storage unit corresponding to the source channel; and
the routing and switching module sends the first packet to the operation unit corresponding to the destination channel for operation processing of the operation type.

4. The processor according to claim 3, wherein
N1 and N2 have same values, and each data packing and unpacking unit corresponds to a storage unit and acquires the packet data from the corresponding storage unit.

5. The processor according to claim 4, wherein
the packet information further comprises: a destination address or a storage strategy,
if the packet information comprises the destination address, the data packing and unpacking unit stores the operation result data in the corresponding storage unit according to the destination address; and
if the packet information comprises the storage strategy, the data packing and unpacking unit stores the operation result data in the corresponding storage unit according to the storage strategy.

6. The processor according to claim 5, wherein the storage strategy comprises: a storage strategy to implement data alignment.

7. A processor implementation method, comprising:
building a processor comprising a system controller, a storage array module, a data packing and unpacking module, and an operation module;
performing a neural network operation by using the processor; wherein the system controller is configured to send predetermined packet information to the data packing and unpacking module; the data packing and unpacking module is configured to acquire corresponding packet data from the storage array module according to the packet information, pack the packet data with the packet information, send a first packet obtained from packing to the operation module for operation processing, acquire a second packet returned by the operation module, unpack the second packet to obtain operation result data, and store the operation result data in the storage array module; the storage array module is configured to store data; and the operation module is configured to perform operation processing on the acquired first packet, generate the second packet according to the operation result data, and return the second packet to the data packing and unpacking module; and
adding a routing and switching module to the processor, the routing and switching module being configured to send the first packet acquired from the data packing and unpacking module to the operation module and send the second packet acquired from the operation module to the data packing and unpacking module,
wherein the operation module comprises: a universal operation module configured to perform universal operation and an activation operation module configured to perform activation operation,
wherein the storage array module comprises N1 storage units;

the data packing and unpacking module comprises N2 data packing and unpacking units, each of the data packing and unpacking units being connected to the routing and switching module through a data channel, N1 and N2 being positive integers greater than 1;

the universal operation module comprises M operation units, and the activation operation module comprises P operation unit, each of the operation units being connected to the routing and switching module through a data channel, M and P being positive integers greater than 1; and the data packing and unpacking unit is configured to pack the packet data acquired from the storage unit with the packet information acquired from the system controller, use the data channel to send, through the routing and switching module, the first packet obtained from packing to the operation unit for operation processing, use the data channel to acquire, through the routing and switching module, the second packet returned by the operation unit, unpack the second packet to obtain operation result data, and store the operation result data in the storage unit.

8. The method according to claim 7, further comprising:
adding a DMA module to the processor, the DMA module being configured to realize high-speed exchange of external storage data with internal storage array data in the storage array module under the control of the system controller.

9. The method according to claim 7, wherein
the packet information comprises: a source channel, a source address, a destination channel, and an operation type;
the packet data is packet data acquired by the data packing and unpacking unit from the source address of the storage unit corresponding to the source channel;
the operation unit acquiring the first packet is an operation unit corresponding to the destination channel determined by the routing and switching module; and
the operation processing is operation processing of the operation type performed by the operation unit.

10. The method according to claim 9, wherein
N1 and N2 have same values, and each data packing and unpacking unit corresponds to a storage unit and acquires the packet data from the corresponding storage unit.

11. The method according to claim 10, wherein
the packet information further comprises: a destination address or a storage strategy;
if the packet information comprises the destination address, the data packing and unpacking unit stores the operation result data in the corresponding storage unit according to the destination address; and
if the packet information comprises the storage strategy, the data packing and unpacking unit stores the operation result data in the corresponding storage unit according to the storage strategy.

12. The method according to claim 11, wherein the storage strategy comprises: a storage strategy to implement data alignment.

13. A non-transitory computer-readable storage medium storing computer instructions therein, wherein the computer instructions are used to cause the computer to perform a processor implementation method, wherein the processor implementation method comprises:

building a processor comprising a system controller, a storage array module, a data packing and unpacking module, and an operation module;

performing a neural network operation by using the processor; wherein the system controller is configured to send predetermined packet information to the data packing and unpacking module; the data packing and unpacking module is configured to acquire corresponding packet data from the storage array module according to the packet information, pack the packet data with the packet information, send a first packet obtained from packing to the operation module for operation processing, acquire a second packet returned by the operation module, unpack the second packet to obtain operation result data, and store the operation result data in the storage array module; the storage array module is configured to store data; and the operation module is configured to perform operation processing on the acquired first packet, generate the second packet according to the operation result data, and return the second packet to the data packing and unpacking module; and adding a routing and switching module to the processor, the routing and switching module being configured to send the first packet acquired from the data packing and unpacking module to the operation module and send the second packet acquired from the operation module to the data packing and unpacking module, wherein the operation module comprises: a universal operation module configured to perform universal operation and an activation operation module configured to perform activation operation, wherein the storage array module comprises N1 storage units;

the data packing and unpacking module comprises N2 data packing and unpacking units, each of the data packing and unpacking units being connected to the routing and switching module through a data channel, N1 and N2 being positive integers greater than 1;

the universal operation module comprises M operation units, and the activation operation module comprises P operation unit, each of the operation units being connected to the routing and switching module through a data channel, M and P being positive integers greater than 1; and the data packing and unpacking unit is configured to pack the packet data acquired from the storage unit with the packet information acquired from the system controller, use the data channel to send, through the routing and switching module, the first packet obtained from packing to the operation unit for operation processing, use the data channel to acquire, through the routing and switching module, the second packet returned by the operation unit, unpack the second packet to obtain operation result data, and store the operation result data in the storage unit.

14. The non-transitory computer-readable storage medium according to claim 13, further comprising:
adding a DMA module to the processor, the DMA module being configured to realize high-speed exchange of external storage data with internal storage array data in the storage array module under the control of the system controller.

* * * * *